United States Patent [19]

Maukola

[11] Patent Number: 4,514,241
[45] Date of Patent: Apr. 30, 1985

[54] REINSULATION OF PIPE JOINTS

[75] Inventor: Pekka J. Maukola, Kessel-lo, Belgium

[73] Assignee: N. V. Raychem S.A., Kessel-lo, Belgium

[21] Appl. No.: 586,912

[22] Filed: Mar. 9, 1984

[30] Foreign Application Priority Data

Mar. 11, 1983 [GB] United Kingdom ................ 8306693

[51] Int. Cl.³ ............................................ B32B 31/26
[52] U.S. Cl. ..................................... 156/79; 138/155; 138/DIG. 5; 156/86; 156/294; 206/231; 285/114; 285/235; 285/381
[58] Field of Search ................ 138/155, 174, DIG. 5; 156/79, 86, 294; 174/84 R, DIG. 8; 206/231; 285/114, 235, 381, DIG. 10

[56] References Cited

U.S. PATENT DOCUMENTS

| 4,049,480 | 9/1977 | Kutschke | 156/79 X |
| 4,232,712 | 11/1980 | Squires | 285/381 X |
| 4,270,961 | 6/1981 | Faranetta et al. | 156/79 X |
| 4,379,575 | 4/1983 | Martin | 285/381 X |
| 4,384,905 | 5/1983 | Gros | 156/79 |
| 4,386,629 | 6/1983 | Cook et al. | 156/86 X |
| 4,469,357 | 9/1984 | Martin | 285/381 |

FOREIGN PATENT DOCUMENTS

1245119 9/1971 United Kingdom .
2056192 3/1981 United Kingdom .
2108625 5/1983 United Kingdom .

Primary Examiner—Robert A. Dawson
Attorney, Agent, or Firm—James G. Passe'; Edith A. Rice; Herbert G. Burkard

[57] ABSTRACT

Insulated pipes are generally bared of insulation at their ends in order to make joints, for example welds, between the pipes. A reinsulating method and assembly is provided for the bared joints, wherein a support comprising a coiled member, for example a helical coil, is positioned around the pipe, a recoverable cover recovered into engagement with the support, and thermally insulating material introduced between the cover and the pipe. The invention is suitable for straight, T, and bent joints.

19 Claims, 11 Drawing Figures

REINSULATION OF PIPE JOINTS

DESCRIPTION

This invention relates to the reinsulation of a joint between two or more heat insulated pipes, for example district heating pipes, the insulation of each of which ends short of the joint.

In the installation of heat insulated pipes it is frequently necessary to make joints between pipes, for example end-to-end joints to join pipes in-line, or "T" piece joints, for example where a branch-off pipe is to be introduced. The actual pipe jointing is generally carried out by welding, brazing or soldering and in order to carry out this operation the heat insulation has to be stripped from the pipes in the region of the joint since the heat required would damage any insulation close to the joint line. After the welding, brazing or soldering operation it is necessary to reinsulate the bared region at the pipe joint. This is necessary both to minimise heat losses of the system and also to smooth the profile of the pipe.

One method that has been used hitherto to reinsulate the bare portion of pipe is to mount two half-shells around the bare portion of pipe, introduce insulating foam into the half-shells, and then provide an enviromental sealing layer, of for example polymeric tape, around the half shells. By appropriate choice of half-shells this method can be used to reinsulate various sizes of pipes and configurations of pipe joints. One major disadvantage, however, is that a different size and shaped half-shell must be provided for each different sized pipe and different configuration of pipe joint. This means a large inventory. A particularly large inventory is needed where branch-off T-joints are be made since in this case two pipe diameters, and also the angle of the branch-off pipe to the main pipe need to be considered. Another problem is that the half-shells tend to be made of metal which can lead to corrosion problems.

The present invention provides a method of insulating a joint between thermally insulated pipes, the insulation of which ends short of the joint leaving a portion of the pipe bare, which comprises:

(a) positioning around the bare portion of pipe a support at least part of which is provided by a coiled member;

(b) positioning a recoverable cover such that a first segment thereof is around the support and when the support is positioned around the pipe, at least one additional segment of the cover can engage the insulation of the pipe;

(c) recovering the first segment of the cover into engagement with the support;

(d) recovering the additional segment of the cover into engagement with the insulation of the pipe; and (e) providing a thermally insulating material between the recovered cover and the bare portion of pipe.

The method according to the present invention may be used, for example, to insulate an in-line joint between two pipes, or a joint between a branch-off pipe and a main pipe. The method may be used to insulate a joint between thermally insulated steel pipes which have an insulation comprising a foam and a jacket.

The invention is of particular use for insulating joints in district heating pipes. Such pipes may comprise a transport pipe of steel surrounded by an insulation comprising foam and a polyethelene jacket.

The order of steps (a) to (e) may be varied, and two or more steps may be performed substantially simultaneously. As an example, the cover may be recovered onto the support either before or after the support is positioned about the bare portion of pipe, that is steps (b) and (c) may precede or follow step (a). As a further example, where the support is positioned before recovery of the cover thereon, the cover may be recovered onto the pipe insulations before, after, or substantially at the same time as it is recovered onto the support.

By a recoverable article is meant an article whose dimensional configuration may be made to change when subjected to an appropriate treatment. Usually these articles recover towards an original shape from which they have previously been deformed but the term "recoverable", as used herein, also includes an article which adopts a new configuration, even if it has not been previously deformed. The article may be heat recoverable, such that its dimensional configuration may be made to change when subjected to heat treatment.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point, or for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in U.S. Pat. No. 4,035,534, an elastomeric member such as an outer tubular member is held in a stretched state by a second member, such as an inner tubular member, which, upon heating weakens and thus allows the elastomeric member to recover.

It has been known to use heat-recoverable articles in combination with a coil before. For example, British Pat. No. 1,245,119 describes a method of building wherein a tubular conduit member is sealed into a wall, the tubular conduit member comprising a heat-recoverable member capable of shrinking diametrically and a reinforcing means, which may be in the form of a coil or a spring, positioned within a central portion of the tubular conduit. Also U.S. Pat. No. 4,289,553 discloses an article which is particularly suitable for use in protection and insulation of electric cables and which comprises a heat-shrinkable sleeve having an inner lining of a continuous metal foil and which is provided with a central reinforcing means comprising one or more longitudinally compressible coils. Neither of these references, however, relate to or would be applicable to the insulation of bare portion of pipe between insulated pipes, as in the present invention.

Any recoverable polymeric material may be used for cover. Suitable materials include polyolefins, for example polyethylene or polypropylene.

The shape and configuration of the cover will depend on the shape of the pipe joint. The cover may be in the form of a tubular sleeve. Such a cover may be used where two pipes are to be joined end-to-end the cover being slipped over an end of one of the pipes before the weld is made and then brought back over the formed weld and recovered into position.

Alternatively the cover may be in the form of a so called wraparound sleeve, that is a sleeve that is wrapped around the pipe and then maintained in its wrapped configuration by securing together opposed edges of the wrapped sleeve. One way of doing this is to provide upstanding rails along longitudinal edges of the sleeve which are held together by a channel, as described in U.S. Pat. No. 3,455,336. An alternative method is to overlap the wraparound sleeve and to apply a closure patch over the overlap. The patch preferably comprises a polymeric sheet coated with a heat activatable adhesive. The polymeric patch may comprise a polyolefin based sheet covered with a high shear hot-melt adhesive, and may also have a contact adhesive hot-melt adhesive, and may also have a contact adhesive to hold the patch secure during installation. Suitable patches are described in U.S. Pat. Nos. 3,770,556 and 4,200,676 and in U.K. Patent Publication No. 2056192, the disclosures of which are incorporated herein by reference. The wraparound sleeve may advantageously be installed after the weld has been formed.

A preferred method is preferably used when the joint to be insulated is a joint between a branch-off pipe and a main pipe. In this case the configuration of the cover is arranged substantially to correspond to that of the pipe at the joint and the method comprises: (a) positioning the coiled member around the branch-off pipe or around the main pipe, and positioning a further part of the support around respectively the main pipe or the branch-off pipe; (b) positioning the cover around the pipe at the joint; (c) and (d) recovering the cover; and (e) providing the insulation material. The further part of the support preferably comprises a wraparound sheet.

Where the pipe at the joint is generally T-shaped, a preferred shaped cover that may be used comprises tubular portion forming the stem of the T, (which can, for example, be slipped over the branch-off pipe before the weld is formed), and a wraparound portion forming the head of the T which can be wrapped around the main pipeline after the weld has been formed.

The size of the cover is selected to match the pipe to be protected. Since the cover is recoverable it is selected to be a loose fit over the pipe weld and surrounding support thus making it easy to install.

Typically for insulated pipes having an outer diameter of 150 mm to 260 mm the circumference of the installed cover, before recovery, is selected to be from 120 to 220 mm greater than the circumference of the support.

The width of the cover depends on the extent to which the insulated jacket has been removed on either side of the weld. The width is selected such that the cover overlaps the insulation on either side of the weld.

Insulating material is introduced into the recovered cover to fill any gaps between the recovered cover and the bare portion of pipe. The insulating material is preferably a liquid which is introduced into the cover and then foams in situ. Polyurethane foam is preferred.

The insulating material may be introduced through a hole made in the insulating jacket on one side of the bare portion of pipe. An air outlet is preferably provided in the insulating jackets on the other, or each other, side of the joint, so that pressure applied forces the insulating material into the gap between the cover and the bare portion of the pipe. Where a wraparound cover is used, or a partly wraparound cover, and the cover held in its wrapped configuration by a closure patch, as described, for example in above mentioned U.S. Pat. Nos. 3,770,556 and 4,200,676 and U.K. Patent Publication No. 2056192, the insulating material may be introduced directly into the cover through a hole made in the closure patch.

After insulating material has been introduced the holes in the closure patch, or in the pipe insulation jacket, or both are preferably covered to protect the insulating material against moisture. This is preferably achieved using a closure means comprising a polymeric backing sheet coated with an adhesive by means of which the backing material is bonded to the closure patch or jacket insulation. Such a closure means is described in our U.K. Patent Publication No. 2108625, the disclosure of which is incorporated herein by reference.

In general, the higher the foaming pressure, and the higher the resultant foam density, the better the insulation of the pipe joint. However, a high foaming pressure acts radially to expand the cover which may deform the cover in the absence of any reinforcement to the cover. In a preferred embodiment a quantity of sealing material such as an adhesive or a sealant (as hereinafter defined), or a combination of an adhesive and sealant is provided between the cover and the support and the method comprises adhering the cover to the support. The support, by its configuration, is resistant to radial expansion, and in turn, inhibits expansion of the cover that is adhered thereto. Thus the support reinforces the cover such that it can withstand a foaming pressure.

The actual foaming pressure in any particular instance depends on the size of the pipes and the normal temperature of operation of the pipes. As a general indication, however, typical foaming pressures are of the order of one to two bars. Where a sealing material such as an adhesive or sealant is provided between the cover and the support, the sealing material is preferably sufficiently strong to resist a gauge pressure of two bars between the cover and the bare portion of pipe.

A sealant is an adhesive material having a cohesive strength of the same order as its adhesive strength, which is used for filling voids and interstices to provide a seal against moisture, dust, solvents and other fluids. Sealant compositions are viscid, water resistant macromolecular compositions ressembling newtonian fluids in exhibiting both viscous and elastic response to stress. They exhibit, in the sense of ASTM 1146, at least second order cohesive blocking (and preferably second order adhesive blocking to metals as well) at a temperature between room temperature and the crystalline melt or glass transition temperature or range of the composition. Known sealant compositions usually comprise mixtures of elastomers, or mixtures of thermoplastic polymers, or both, include mastics, and hot melt sealants as described in Bullman, Adhesives Age, November 1976, pages 25-28.

The sealing materials are preferably heat activable, for example a hot melt adhesive. Such a sealing material is especially suitable for use with a heat recoverable cover since it may be selected to be activated by the heat applied to recover the cover.

The sealing material may be provided in any convenient manner between the cover and the support, for example it may be provided on the cover or on the support, for example as a coating on the inner surface of the cover or on the outer surface of the support.

Adhesive or other sealing material, is also preferably provided to seal the cover to the cut-back insulation jacket on either side of the joint The sealing material may be provided as a coating on the cover. Such a coating is particularly convenient for applications where the cover comprises a tubular sleeve or a wraparound sleeve suitable for covering an end-to-end pipe joint. In a particular preferred embodiment a coated cover as described in our U.K. Published Specification No. 2108625 is used, the coating comprising sealant (as herein defined); and a heat activatable adhesive, the sealant being provided as a first region of a principal surface of the cover and the adhesive being provided as a second region of said surface. In this case the method preferably includes activating the adhesive to form a substantially annular bond between the pipe and the cover. Preferably the sealant and the adhesive are arranged such that a ring of the sealant, which provides a flexible waterproof seal, is sandwiched between two rings of adhesive which provide a second seal and moreover prevent any long range movement between the cover and the pipe. In one preferred embodiment the sealant is positioned around the bare portion of pipe and the two rings of adhesive positioned to seal the ends of the cover to respective areas of the pipe jackets on either side of the joint.

Where the cover comprises a T-shaped cover suitable for covering a branch-off joint, it is not convenient to coat the entire inner surface of the cover. In this case it is more convenient to coat, instead, the outer surface of the support in order to provide a layer of adhesive or sealant between the cover and the support.

Thus a second aspect of the present invention provides a kit of parts for insulating a joint between an insulated main pipe and a branch-off pipe, the insulation of which ends short of the joint, which comprises;

(a) a support which comprises a coiled member that can be positioned around a bare portion of the branch-off pipe, and a further part that can be wrapped around the bare portion of the main pipe; and (b) a recoverable cover having a first tubular portion for covering the installed coiled member and a second wraparound portion for covering the further part of the support;

wherein the support is coated on an outer surface thereof with a sealing material, such as an adhesive or sealant, such that it is capable of adhering to said cover.

In another embodiment the coiled member is arranged such that it can be positioned around a bare portion of the main pipe, and the further part of the support such that it can be wrapped around a bare portion of the branch-off pipe.

Preferably a heat activatable sealing material, especially preferably a hot melt adhesive is used as a coating for the support. Especially preferably the cover is heat recoverable and the heat applied to recover the cover also activates the sealing material.

The sealing material may be provided to cover, partly or entirely, each of the cover and the sealant. Thus although it is inconvenient to coat the whole inner surface of a cover in, for example, the form of a T-shaped sleeve, it is relatively easy and convenient to coat the ends of the sleeve. Preferably, therefore a sealing material such as an adhesive and/or sealant is provided at the ends of the cover to seal the cover to the pipe insulation on either side of the bare portion of pipe. Especially preferably a sealant adhesive combination is used, a sealant being provided as a first region on a principle surface of the cover and the heat activatable adhesive as a second region on the surface, which adhesive form, when the sleeve is in use, a substantially annular band between the insulated pipe and the cover. Especially preferably and sealant/adhesive combination comprises an annular ring of sealant sandwiched between two annular rings of adhesive as described in the aforementioned U.K. Published Specification No. 2108625. The sealant provides a flexible waterproof seal and the adhesive provides a second seal and prevents long range movement between the sleeve and the pipe.

Preferably the kit of parts additionally comprises a closure patch comprising a polymeric sleeve coated with heat activatable adhesive to retain the wraparound position in the wrapped position. Especially preferably the patch has a hole arranged to allow provision of thermally insulating material between the cover and the bare portion of pipe.

The nature of the support will now be considered. The support is provided at least in part by a coiled member. In one embodiment, that is particularly suitable for simple joints, such as in line joints, we prefer the support is provided substantially entirely by the coiled member. In the case of a branch-off joint, two coiled members may be used, one for the main pipe and one for the branch-off pipe; or one coiled member may surround, say, the branch-off and a sheet member be provided around the main pipe.

In one embodiment the coiled member comprises a helically wound coil. In another embodiment the coiled member comprises a corrugated member, the ribs of which corrugated member may, for example, extend helically or annularly. The corrugated member may for example comprise aluminium foil, the thickness of the foil and the corrugations preferably being arranged to enable the coiled member to be compressed longitudinally, either to facilitate installation or to provide a coiled member of larger radial dimension, and also enables the coiled member to flex around a curved or bent joint.

The coiled member may be provided with a flexible wall covering, for example a wall covering of paper or aluminium foil. The wall covering is preferably arranged to enable the coiled member to be compressed longitudinally. Where a quantity of sealing material is provided between the cover and the support this can, in one embodiment, conveniently be provided as a coating on the outward facing surface of the flexible wall covering of the coil.

The coiled member is preferably flexible, the extent and manner of flexibility depending on the method of positioning the coiled member around the bare pipe joint, and also on the configuration of the pipe joint. Where a coiled member in the form of a helically wound coil is used, it is preferably flexible such that it can be installed by twisting it, one turn of the spring at a time, around the pipe joint. This method of installation is advantageous since it enables the coiled member to be installed after jointing. The coiled member, of whatever form, may instead, or in addition, be flexible such that it can be compressed longitudinally, and can thus be installed by slipping it over the end of one of the pipes to be welded, and then compressing it longitudinally to hold it out of the way while the joint is made. Where the bare portion of pipe is not straight, the coiled member must be flexible such that the coiled member will flex around the curved or bent joint. Where a helical coiled member is used the flexibility depends both on the material used and also on the spacings between the turns of the helix.

Other criteria are: that the coiled member should be sufficiently strong to support the cover that is recovered thereon; and that if an adhesive or other sealant is to be used to adhere the cover to the coiled member such that it can withstand a foaming pressure, the coiled member must be compatible with the adhesive and cover such that a good bond is formed. Selection of the material of the coiled member for any particular application would be apparent to the man skilled in the art. A particularly suitable material that can be used, which provides good support and good flexibility is carbonised steel.

The length of the coiled member will depend upon the extent to which the insulating jacket has been removed on either side of the weld. The coiled member preferably abuts both ends of the cut-back insulation. The coiled member may be of a length such that it fits exactly between the cut back insulation, or may be slightly longer than this such that it may be held in compression between the cut back insulation. The radial extent of the coiled member, at least at the ends of the coiled member where it advantageously abuts the cut-back insulation, is preferably the same as that of the cut back insulated jackets such that when the cover is recovered thereon the joint has a smooth profile.

It is an advantage of the present invention that one diameter coiled member can conveniently be used for a variety of diameters of insulated pipes, since in a preferred embodiment the radial extent, at least at the ends of the coiled member, can be increased or decreased to correspond to that of the cut-back insulation. This can be achieved, for example, simply and conveniently by twisting the ends of the member. Instead, or in addition, the coiled member can be compressed or stretched longitudinally thereby increasing or decreasing its radius. Thus inventory is reduced. The coiled member may be provided longer than is required and then cut to length by the installer.

The coiled support, therefore, advantageously reduces inventory compared, for example, to where half-shell supports are used. Furthermore the coiled support is less expensive than the half-shells.

Embodiments of the present invention will now be described, by way of example, with reference to the accompanying drawings, wherein.

Figure 1:
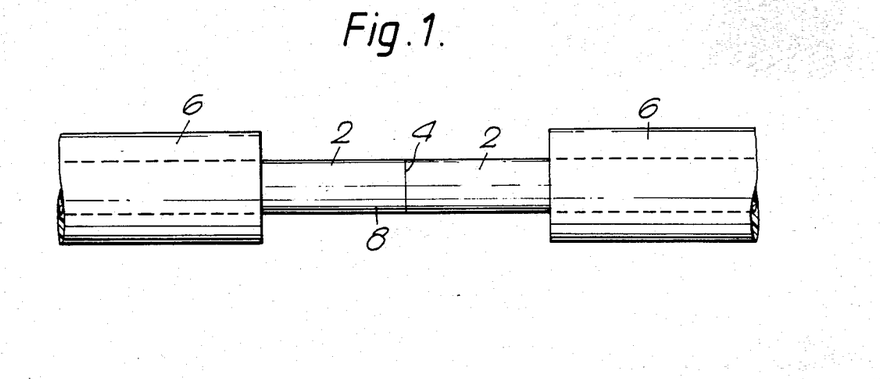
FIG. 1 is a side elevation of joint between two or more heat insulated pipes, the insulation of each of which ends short of the joint, which is to be reinsulated according to the present invention.
Figure 2:
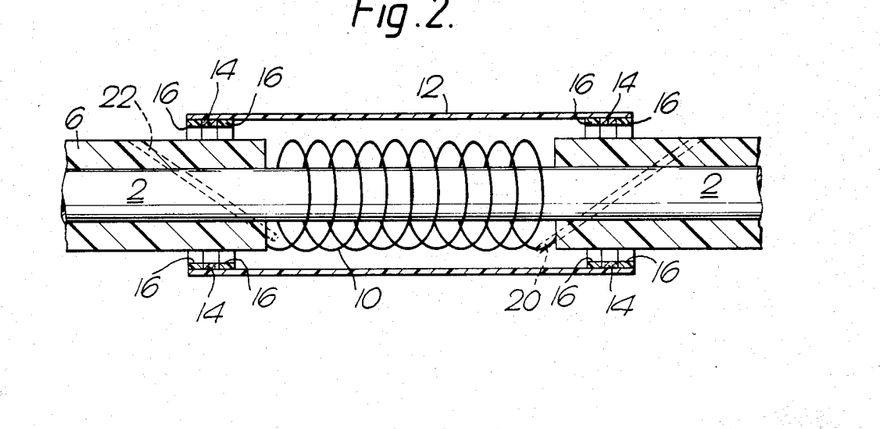
FIGS. 2 and 3 are cross-sectional views through the pipe joint of FIG. 1 at sequential stages during reinsulation according to the present invention.
Figure 3:
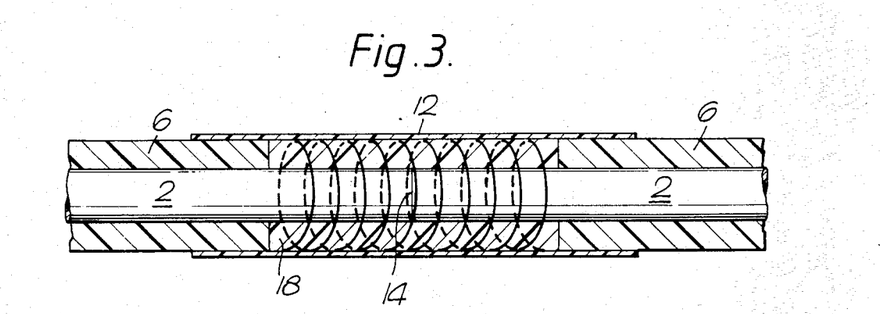

Referring to FIGS. 1 to 3, FIG. 1 shows a straight joint between two heat insulated district heating pipes 2. The pipes have been joined by a weld 4. The heat insulation 6 on each pipe has been cut-back so that it ends short of the weld 4 thereby expanding a length of pipe for welding and protecting the insulation from heat damage during welding.

FIGS. 2 and 3 are sequential stages in the reinsulation of the portion 8 of pipe between the cut-back insulations in FIG. 1. A coil 10 of carbonised steel is wrapped around the bare pipe portion 8. The coil is flexible so that it can be easily wrapped. The coil is cut to an appropriate length such that when it is compressed longitudinally between the cut-back insulation 6 on either side of the joint it expands radially to a diameter equal to that of the insulation 6. A heat shrinkable wraparound sleeve or cover 12 is wrapped around the coil 10 such that its opposed edges overlap, and the overlapped edges are then retained together by a closure patch (not shown) in the form of a polymeric sheet with an adhesive backing. The sleeve 12 overlaps the pipe insulation 6 on each side of the pipe weld 4 wraparound sleeve for sealing each end of the sleeve to the pipe material. Heat is then applied. This causes the sleeve to shrink into contact with the coil and activates the hot melt adhesive and the sealant which form a seal between the sleeve 12 and the pipe insulations 6. The mastic 14 ensures a flexible waterproof seal and the hot melt adhesive provides a second seal and prevents any long range movement between the sleeve and the pipe.

Polyurethane liquid 18 is then poured into the space between recovered cover and the bare pipe portion 8 through a passage 20 formed in the pipe insulation 6 on one side of the weld 4. An air outlet passage 22 is provided in the pipe insulation 6 on the other side of the weld 4 and the liquid polyurethane is installed by applying a pressure down the passage 20. The polyurethane liquid foams in situ to insulate the joint. FIG. 3 shows the completed reinsulated recovered joint.

Turning now to FIGS. 4 to 8, FIG. 4 shows a branch-off pipe 30 which is to be connected to a main pipe 32. The heat insulation 34, on the branch-off and main pipe respectively has been cut-back so that it ends short of the weld area.

Figure 4:
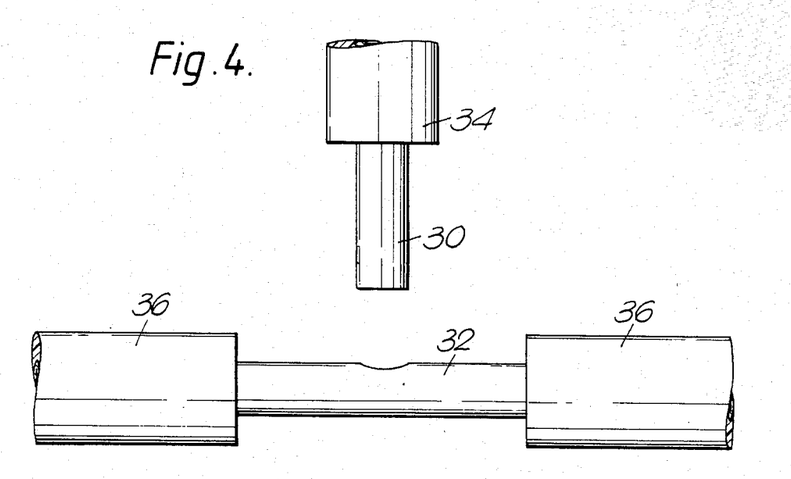
FIG. 4 is a side elevation of the branch-off joint between an insulated main pipe and an insulated branch-off pipe, the insulation of each pipe on each side of the joint ending short of the joint.

FIGS. 5 to 8 show stages in the reinsulation of the joint of FIG. 4.

Figure 5:
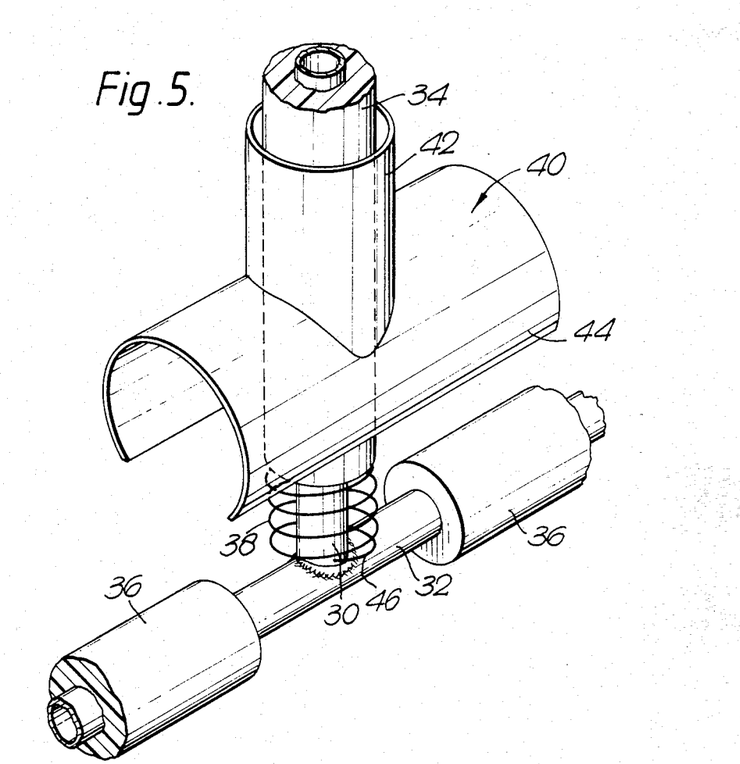
FIGS. 5 and 6 are perspective views of the pipe joint of FIG. 4 at sequential stages during reinsulation according to the present invention.

In FIG. 5 a first coil 38 of carbonised steel has been positioned over the branch-off pipe 30, and a T-shaped cover 40 positioned over the coil 38. The T-shaped cover 40 comprises a tubular portion 42 which fits over the coil 38 and a wraparound portion 44. A weld 46 has been made between the branch-off pipe 30 and the main pipe 32. Durin the welding operation the cover 40 must be held away from the weld area to avoid damage by the heat, for example the cover 40 may conveniently be slid over and along the heat insulation 34 on the pipe 30 during welding.

Figures 6, 7:
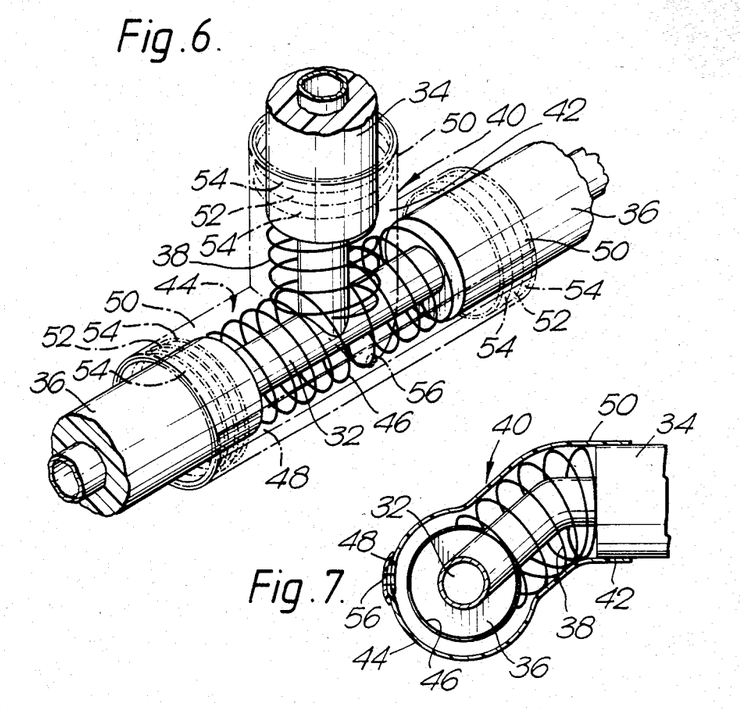
FIG. 7 is a sectional view taken through the branch-off pipe in FIG. 6.

In FIG. 6 a second coil 46 of carbonised steel has been wrapped around the main pipeline 32. The support is therefore provided entirely by coils. The coil is flexible so this wrapping can be achieved. The cover 40 has also been repositioned over the weld area 46 and the wraparound portion 44 of the cover 40 wrapped around the second coil 46. The wraparound portion 44 is held in its wrapped configuration by a closure patch 48 in the same way described with reference to FIGS. 1 to 3. The ends 50 of the cover 40 overlap the pipe insulation 34,36 on each side of the weld 40, and also have an internal coating of a ring of mastic 52 sandwiched between two rings of hot melt adhesive 54. Heat is applied causing the cover 40 to shrink and the mastic and adhesive to flow to enclose and seal the weld area.

Insulating polyurethane liquid that foams in situ is then introduced into the space inside the cover 40. This liquid may be introduced along passages in the pipe insulation on one side of the weld, as described with reference to FIGS. 1 to 3. Alternatively, or in addition, the insulating material may be introduced directly into the cover, through a hole 56 in the closure patch. After the polyurethane liquid has foamed the hole 56 is preferably plugged in order that the insulating foam is protected from moisture. A closure means (not shown) comprising a polymeric backing sheet and an adhesive coating may be used.

FIG. 7 shows a sectional view taken through the branch-off pipe 30 of FIG. 6. It will be seen that the branch-off pipe bends at an angle of about 45° as it joins the main pipe 32. The coil 38, being flexible, accomodates the bend while maintaining a smooth profile on to which the cover 40 shrinks. This illustrates one of the advantages of the present invention, that it can be adapted to bends of various angles in the pipes.

Figure 8:
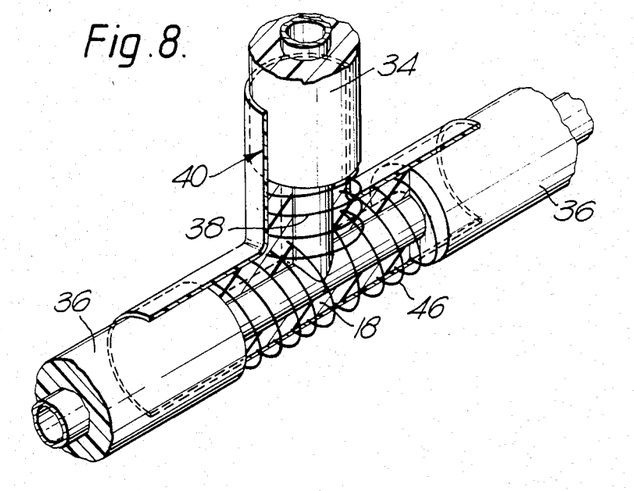
FIG. 8 is a perspective view showing the final stage in the reinsulation of the joint of FIG. 4.

FIG. 8, shows the completed, recovered, reinsulated joint.

Figure 9:
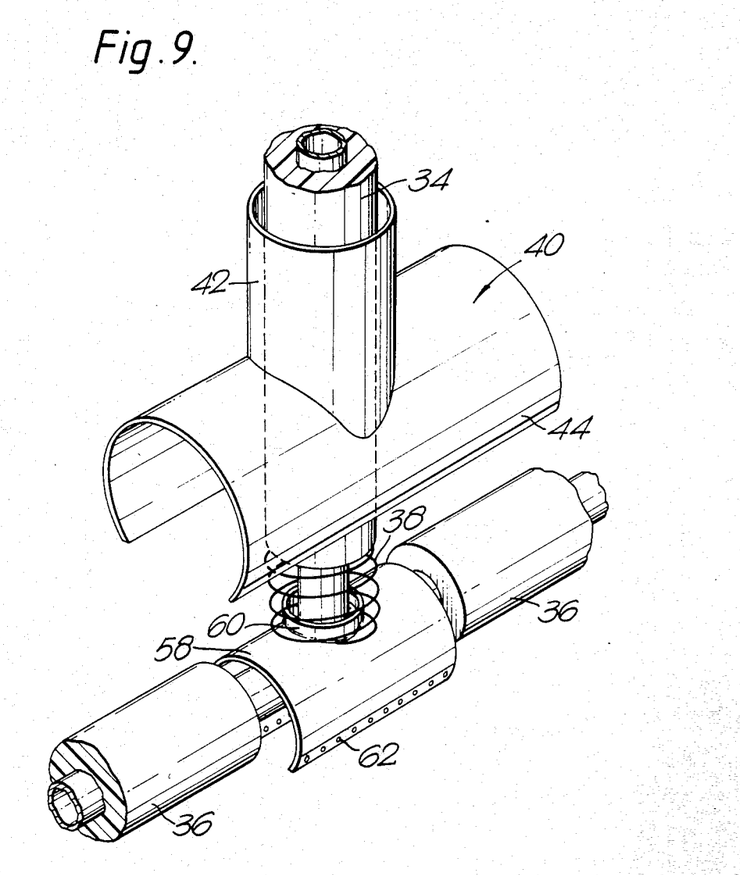
FIG. 9 is a side elevation of a pipe joint where the support is provided by a coil and a wraparound sheet.

FIG. 9 shows a two part support comprising a coil 38 and a sheet 58. The sheet 58 is provided with an opening 60 for the branch-off pipe 34, which is surrounded by a flange for engagement with the coil 38. Where such a sheet is used it is preferred that it be used around the main pipe, and a coil used around the branch-off pipe, although the positions of the two components may be reversed.

The sheet part 58 of the support may be made of any material of sufficient strength, and plastics such as polyethylene or polypropylene and metal are preferred. The part 58 may itself comprise two or more parts in order that it be installed after the pipe joint is made. Such two or more parts may interlock by any suitable means, where necessary, or be supplied hinged or otherwise moveably connected together. Two of the many possibilities are shown in FIGS. 10a and 10b.

Figure 10A:
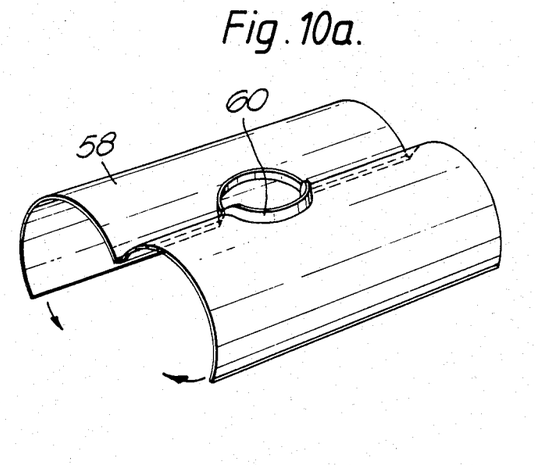
FIGS. 10a and 10b show two designs of a part of the support made from sheet material.

The part 58 in FIG. 10a is positioned over the branch-off pipe 34 and the two half-shells hinged together around the main pipe, as indicated by the arrows.

Figure 10B:
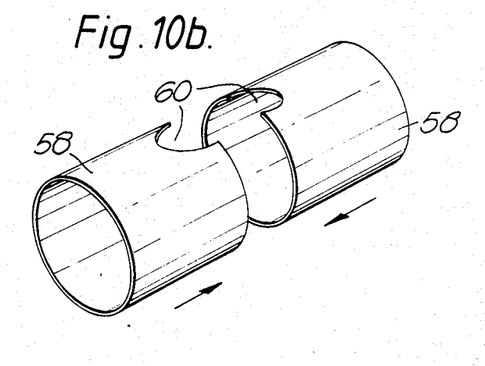

Two cylindrical parts are shown in FIG. 10b. The two parts are provided on the main pipe, one at each side of the joint. They are brought together in the directions of the arrows so that the recesses 60 close around the branch-off pipe. The two ideas could be combined so that each part 58 shown in FIG. 10b is of the wraparound type.

I claim:

1. A method of insulating a joint between thermally insulated pipes, the insulation of which ends short of the joint leaving a portion of the pipe bare of insulation, which method comprises:
    (a) positioning around the bare portion of pipe a support at least part of which is provided by a coiled member;
    (b) positioning a recoverable cover such that a first segment thereof is positioned around the support such that when the support is positioned around the pipe, at least one other segment of the cover is positioned so as to engage the insulation of the pipe upon recovery of the cover;
    (c) recovering the first segment of the cover into engagement with the support;
    (d) recovering at least one other segment of the cover into engagement with the insulation of the pipe; and
    (e) providing a thermally insulating material between the recovered cover and the bare portion of pipe.

2. A method according to claim 1, which additionally comprises providing a sealing material between the cover and the support and adhering the cover to the support.

3. A method according to claim 2, wherein the sealing material is provided as a coating on the cover.

4. A method according to claim 2, wherein the sealing material sealant is provided on the support.

5. A method according to claim 2, wherein the cover is heat-recoverable and the sealing material is heat-activatable and wherein the step (c) and/or (d) comprises heating the cover to effect recovery and activation of the sealing material.

6. A method according to claim 1, wherein the insulating material is a liquid which foams when it is between the cover and the bare portion of pipe.

7. A method according to claim 1, wherein the cover comprises a wraparound sleeve, and wherein a method additionally comprises holding the recovered sleeve in its wrapped configuration by a closure patch comprising a polymeric sheet coated with a heat activatable adhesive, and wherein step (e) comprises introducing insulating material through a hole in the closure patch.

8. A method according to claim 1, in which step (e) comprises introducing the insulating material through a hole in the pipe insulation jacket on one side of the recovered patch.

9. A method according to claim 1, wherein the joint is a joint between a branch-off pipe and a main pipe, the configuration of the cover substantially corresponding to that of the pipe at the joint, wherein the method comprises:
    (a) positioning the coiled member around the branch-off pipe or around the main pipe, and positioning a further part of the support around respectively the main pipe or the branch-off pipe;
    (b) positioning the cover around the pipe at the joint;
    (c) and (d) recovering the cover; and
    (e) providing the insulation material.

10. A method according to claim 9, where the pipe at the joint is generally T-shaped, the cover comprising a tubular portion forming the stem of the T, and a wraparound portion forming the head of the T; step (b) including wrapping the wraparound portion around the main pipe and securing it in the wrapped configuration.

11. A method according to claim 9, wherein the further part of the support comprises a wrap-around sheet.

12. A method according to claim 3, wherein the coating comprises a sealant and a heat activatable adhesive, the sealant being provided as a first region of a principal surface of the cover and the adhesive being provided as a second region of said surface, and the method including activating the adhesive to form a substantially annular bond between the pipe and the cover.

13. A method according to claim 12, wherein the sealant is sandwiched between two regions of heat activatable adhesive.

14. A method according to claim 1, which additionally comprises longitudinally compressing the coiled member between the insulations on either side of the portion of pipe, thereby radially expanding the coiled member.

15. A kit of parts for insulating a joint between an insulated main pipe and a branch-off pipe, the insulation of which ends short of the joint, which comprises:
(a) a support which comprises a coiled member that can be positioned around a bare portion of the branch-off pipe, and a further part that can be wrapped around the bared portion of the main pipe; and
(b) a recoverable cover having a first tubular portion for covering the installed coiled member and a second wraparound portion for covering the further part of the support;

wherein the support is coated on an outer surface thereof with an adhesive or sealant such that it is capable of adhering to said cover.

16. A kit of parts according to claim 15, wherein a coating of sealant and/or adhesive is provided at the ends of the cover such that a seal is provided on installation between the insulation and the cover on each side of the bare portion of pipe.

17. A kit of parts according to claim 15, wherein sealant and heat-activatable adhesive is provided, the sealant as a first region on a principal surface of the cover and the heat activatable adhesive as a second region of the surface, which adhesive forms, when the sleeve is in use a substantially annular bond between the insulated pipe and the cover.

18. A kit of parts according to claim 15, which additionally comprises a closure patch comprising a polymeric sleeve coated with heat activatable adhesive to retain the wraparound portion in the wrapped position.

19. A kit of parts according of claim 15, wherein the patch has a hole arranged to allow provision of thermally insulating material between the cover and the bare portion of the pipe.

* * * * *